(12) United States Patent  
Matsumoto

(10) Patent No.: US 9,423,600 B2  
(45) Date of Patent: Aug. 23, 2016

(54) ABERRATION CORRECTION OPTICAL UNIT AND LASER MICROSCOPE

(71) Applicant: CITIZEN HOLDINGS CO., LTD., Tokyo (JP)

(72) Inventor: Kenji Matsumoto, Tokyo (JP)

(73) Assignee: CITIZEN HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 14/421,779

(22) PCT Filed: Aug. 16, 2013

(86) PCT No.: PCT/JP2013/072028  
§ 371 (c)(1),  
(2) Date: Jun. 26, 2015

(87) PCT Pub. No.: WO2014/027694  
PCT Pub. Date: Feb. 20, 2014

(65) Prior Publication Data  
US 2015/0293337 A1    Oct. 15, 2015

(30) Foreign Application Priority Data

Aug. 16, 2012    (JP) .................. 2012-180420

(51) Int. Cl.  
*G02B 21/06*    (2006.01)  
*G02B 21/00*    (2006.01)  
(Continued)

(52) U.S. Cl.  
CPC ............ *G02B 21/0072* (2013.01); *G02B 21/00* (2013.01); *G02B 21/0068* (2013.01);  
(Continued)

(58) Field of Classification Search  
CPC ............... G02B 21/00; G02B 21/0024; G02B 21/0032; G02B 21/0068; G02B 21/0072; G02B 21/0092; G02B 21/06; G02B 27/0031; G02B 27/0068; G02F 1/00; G02F 1/01; G02F 1/0136; G02F 1/03; G02F 1/0311; G02F 1/07; G02F 1/13; G02F 1/133; G02F 1/1347  
USPC ................. 359/250, 279, 368, 371, 385, 386; 349/1, 4, 5, 65, 96, 139, 193, 194, 201, 349/202; 353/20  
See application file for complete search history.

(56) References Cited

U.S. PATENT DOCUMENTS

| 5,530,590 A | 6/1996 | Saito |
| 6,525,875 B1 * | 2/2003 | Lauer .................. G03H 1/0443 359/368 |

(Continued)

FOREIGN PATENT DOCUMENTS

| JP | 3299808 B2 | 4/2002 |
| JP | 2006-085801 A | 3/2006 |

(Continued)

OTHER PUBLICATIONS

International Search Report for PCT/JP2013/072028, Sep. 24, 2013.  
(Continued)

*Primary Examiner* — Loha Ben

(57) ABSTRACT

An aberration correction optical unit (3) disposed in an optical system includes: a first phase modulation element (3a) and a second phase modulation element (3c) each having a polarization characteristic; and a variable waveplate (3b) disposed between the first and second phase modulation elements so that an optical axis of the variable waveplate has a predetermined angle with respect to optical axes of the two phase modulation elements, in order to correct an aberration generated by the optical system.

9 Claims, 12 Drawing Sheets

(51) Int. Cl.
*G02F 1/01* (2006.01)
*G02B 27/00* (2006.01)
*G02F 1/1347* (2006.01)
*G02F 1/13* (2006.01)

(52) U.S. Cl.
CPC ............ *G02B21/06* (2013.01); *G02B 27/0031* (2013.01); *G02B 27/0068* (2013.01); *G02F 1/01* (2013.01); *G02F 1/0136* (2013.01); *G02F 1/1347* (2013.01); *G02B 21/0024* (2013.01); *G02B 21/0032* (2013.01); *G02B 21/0092* (2013.01); *G02F 1/13* (2013.01)

(56) References Cited

U.S. PATENT DOCUMENTS

| | | | |
|---|---|---|---|
| 8,643,822 B2* | 2/2014 | Tan | B29D 11/0074 349/129 |
| 9,069,227 B2* | 6/2015 | Kirkby | G02B 21/0024 |
| 9,176,333 B2* | 11/2015 | Yokoyama | G02F 1/1313 |
| 2003/0063379 A1 | 4/2003 | Fukuyama et al. | |
| 2007/0183293 A1 | 8/2007 | Murata et al. | |
| 2008/0013433 A1 | 1/2008 | Kimura et al. | |
| 2009/0231692 A1 | 9/2009 | Yoshida et al. | |

FOREIGN PATENT DOCUMENTS

| | | |
|---|---|---|
| JP | 2007-065151 A | 3/2007 |
| JP | 4149309 B | 7/2008 |
| JP | 4554174 B2 | 7/2010 |
| JP | 2011-180290 A | 9/2011 |

OTHER PUBLICATIONS

European Patent Office, Extended European Search Report for EP Patent Application No. 13879288.2, Feb. 25, 2016.

Nabeel A. Riza et al., "Liquid Lens Confocal Microscopy with Advanced Signal Processing for Higher Resolution 3D Imaging", Medical Imaging: PACS and Integrated Medical Information Systems: Design and Evaluation, Feb. 26, 2009, p. 725848, vol. 7258, SPIE, Bellingham, WA USA.

* cited by examiner

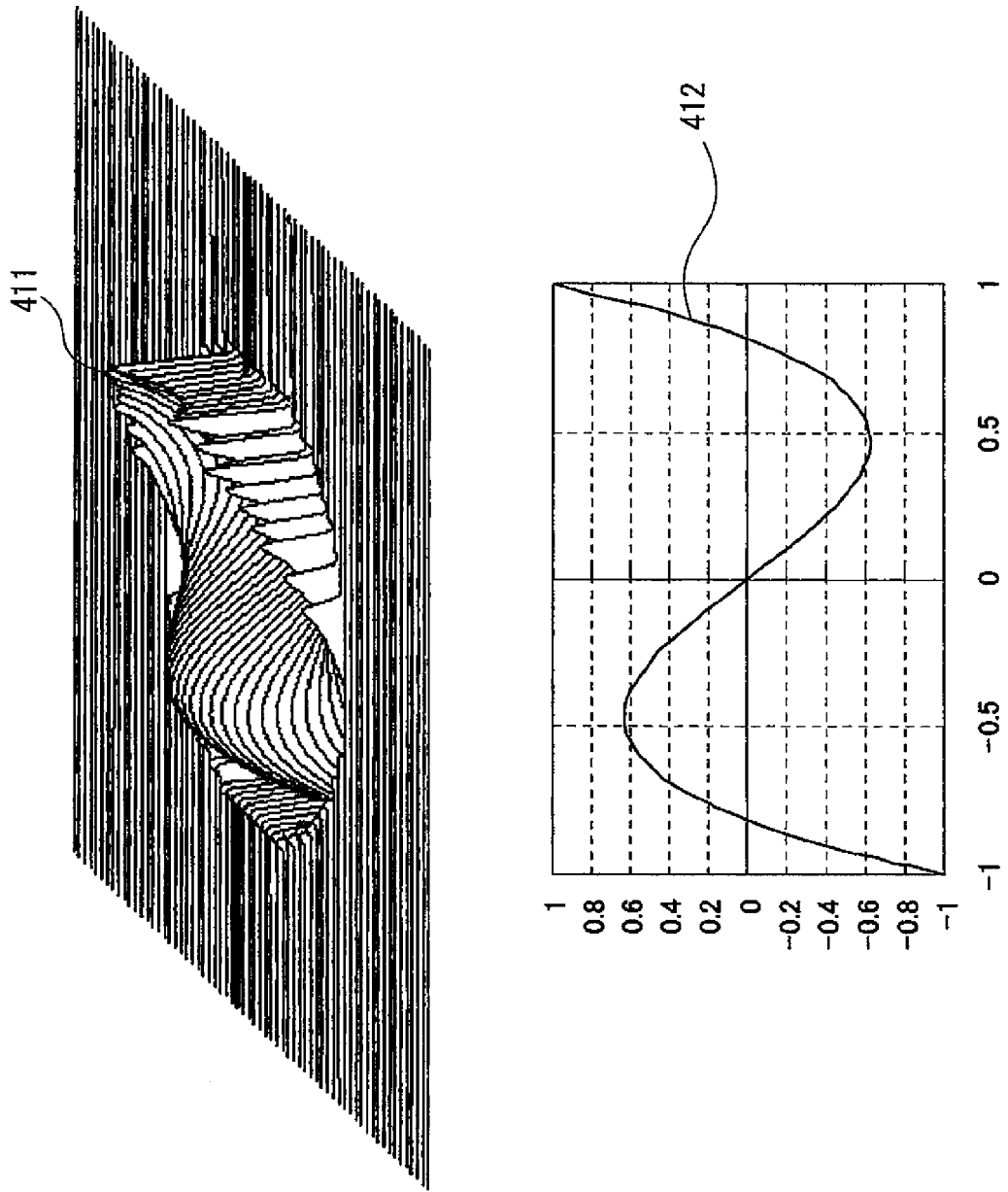

ABERRATION CORRECTION OPTICAL UNIT AND LASER MICROSCOPE

TECHNICAL FIELD

The present invention relates to an aberration correction technique for an optical system and to a technique for controlling an aberration, which is generated depending on a specimen or an observation condition, in accordance with an observation mode or specifications of a microscope, specifically, a laser microscope.

BACKGROUND ART

A laser microscope focuses laser light on a specimen through an objective lens and scans the specimen with the laser light in two directions (X-direction and Y-direction) orthogonal to each other along a plane perpendicular to an optical axis to acquire a planar image of the specimen. On the other hand, a plurality of tomographic images (Z-stack images) along the Z-direction are obtained by changing a distance along the optical axis direction (Z-direction) between the objective lens and the specimen, whereby the laser microscope forms a three-dimensional image of the specimen.

In a confocal laser microscope which is the mainstream in laser microscopes, a light flux of reflected or scattered light or fluorescence generated on a specimen is transmitted by an optical system, and light flux transmitted through a pinhole disposed at an optically conjugated position with respect to a light focusing point on the specimen is received by a detector. Disposing the pinhole makes it possible to filter the light generated on the specimen other than the light focusing point. Therefore, the confocal laser microscope is operable to acquire an image with a good S/N ratio.

Further, a multi-photon microscope increases a photon density on the focal plane by focusing laser light by an objective lens having a large numerical aperture NA. Thereby, a fluorescent molecule absorbs a plurality of photons (N photons) simultaneously and then the fluorescent molecule is excited with energy N times of common energy in intensity. For example, in a two-photon microscope, two photons hit a fluorescent molecule simultaneously and fluorescence having a wavelength half that of common fluorescence is observed. A probability in which two photons hit the fluorescent molecule simultaneously is very small and therefore, no emission occurs from a region other than the focal point. Therefore, even without the pinhole described above, the multi-photon microscope is operable to acquire only specimen information of the focal point.

In observing a biospecimen, the biospecimen is often observed through a cover glass in a state in which the biospecimen is immersed in a broth. Further, generally, the objective lens is designed so that an imaging performance is best at a position immediately below the cover glass having a predetermined thickness and therefore, an aberration due to the objective lens is generated when an optical path length to an observation plane is changed. In observing the inside of a biospecimen, it is necessary to acquire an image at an observation position equivalent to a depth where a broth or biological tissues are transmitted, and an aberration is generated in proportion to a distance from a position immediately below the cover glass to the observation position, resulting in a decrease in resolution.

This aberration will be described in detail with reference to FIG. 2A and FIG. 2B. FIG. 2A and FIG. 2B are diagrams each schematically illustrating an aberration generated depending on a depth of a specimen to be observed. To simplify the description, the objective lens is assumed to be designed to be optimized in observing a medium having a uniform refractive index. FIG. 2A illustrates a light flux 100 in observing a medium having a uniform refractive index used in the design. FIG. 2A illustrates that the light flux 100 is focused on one point without aberration. Contrary to the above, FIG. 2B illustrates a light flux 110 in observing a surface of a specimen at the depth D. The light flux 110 is refracted on an interface 111 between the medium in contact with the objective lens and the specimen and therefore, the light flux 110 is not focused on one point due to the generated aberration.

For example, when the objective lens is a dry lens, a space between the objective lens and the specimen is filled with air. Therefore, a refractive index of the medium (air) between the objective lens and the specimen is 1.0, which is different from a refractive index of a biospecimen (e.g., 1.39). Therefore, an aberration is generated in proportion to a difference between the refractive index of the medium between the objective lens and the specimen and the refractive index of the biospecimen, as well as an observation depth of a biological body. On the other hand, when the objective lens is a water immersion lens, a space between the objective lens and the specimen is filled with water. Therefore, a refractive index of the medium (water) between the objective lens and the specimen is 1.333, which is closer to the refractive index of the biospecimen than the refractive index of air. Therefore, the water immersion lens is suitable for observing a deep portion of a biological body. However, the refractive index of the biospecimen is not equal to the refractive index of water and therefore, an aberration is also generated due to a difference between the refractive index of the biospecimen and the refractive index of water. Therefore, a decrease in resolution is still problematic.

Further, the cover glass also has variations in the thickness thereof within a tolerance range from a design value (e.g., 0.17 mm). An aberration is generated in proportion to a difference of an actual thickness of the cover glass from the design thickness due to a difference between a cover glass refractive index of 1.525 and a biospecimen refractive index of 1.38 to 1.39. A spherical aberration having a phase distribution symmetrical with respect to an optical axis is generated due to these deviations from the design value.

As one means for solving image quality deterioration resulting from the aberrations described above, a correction ring is known. The correction ring is a ring-shaped rotary member provided for an objective lens, and distances between lens groups constituting the objective lens are changed by rotating the correction ring. Thereby, an aberration due to an error in a thickness of the cover glass or in observing a deep portion of a living body is cancelled. A scale is marked on the correction ring and, for example, rough numerical values such as 0, 0.17, and 0.23 are indicated with respect to the thickness of the cover glass. Then, adjusting the scale of the correction ring in accordance with a thickness of an actually used cover glass makes it possible to adjust the distances between the lens groups in such a manner as to optimize the distances in accordance with the thickness of the cover glass (e.g. see Patent Literature 1).

Further, a technique of compensating for a generated aberration by a wave front conversion element which is one example of an aberration correction device is also known. In this technique, a matrix-drivable shape variable mirror element is disposed on an optical path of a microscope, a wave front shape is modulated by the shape variable mirror element based on wave front conversion data measured in advance, and modulated light waves are allowed to be incident on a specimen, whereby an aberration-corrected image having a high imaging performance is acquired (e.g. see Patent Literature 2).

Further, as the wave front conversion element, a spatial light modulation element of an LCOS (Liquid Crystal on Silicon) type is known, in which a voltage is applied to each pixel of a liquid crystal element where pixels are arrayed in a matrix manner and a refractive index of liquid crystal is changed to display a phase distribution which cancels a wave front aberration (e.g. see Patent Literature 3). The spatial light modulation element of an LCOS type is an electro-optic phase modulation element of a reflection type in which a direct liquid crystal layer is formed in an address unit prepared using CMOS technology and a phase modulation amount of each pixel is controlled by a drive voltage.

Further, a microscope control method for controlling an aberration correction amount based on a distance between an objective lens and a specimen using such correction means is also known (e.g. see Patent Literature 4).

CITATION LIST

Patent Literature

Patent Literature 1: Japanese Patent Publication No. 3,299,808 (see pages 4-6, and FIG. 1)
Patent Literature 2: Japanese Patent Publication No. 4,149,309 (see pages 3-5, and FIG. 1)
Patent Literature 3: Japanese Laid-open Patent Publication No. 2011-180290 (see page 13)
Patent Literature 4: Japanese Patent Publication No. 4,554,174 (see FIG. 1)

SUMMARY OF INVENTION

Technical Problem

However, the operation of the correction ring is performed by manually rotating a ring-shaped adjustment mechanism provided on the objective lens. Therefore, a focus deviation or a view field deviation resulting from adjustment of the adjustment mechanism may occur. Further, to determine an optimum position of the objective lens, it is necessary to repeat the adjustment of the correction ring and focusing, resulting in a problem in which a process for the optimization is cumbersome. Since the process is cumbersome, it takes time to make an adjustment in order to obtain the optimum position, and a fluorescent pigment may fade. The fading of the fluorescent pigment is a problem of weakening fluorescent intensity due to continuous emission of excitation light.

Further, the adjustment of the correction ring requires fine control. Under the present circumstances, judgment on the adjustment result relies on a person who visually observes an image and therefore, it is very difficult to judge whether the objective lens is located at an optimum position. In particular, in photographing images of Z-stack, it is necessary to repeat this operation for the number of images acquired in a depth direction, which is very cumbersome. Therefore, under the present circumstances, the number of users who sufficiently use the correction ring is small. Further, in some specimens, vibrations resulting from touching the correction ring by hand may affect the observation position and therefore, it is preferable to automatically adjust the correction ring without touching the correction ring by hand.

Further, in the technology of compensating for an aberration by a wave front conversion element, the wave front conversion element is a reflection type and therefore, it is difficult to insert the wave front conversion element into an existing microscope optical system. Therefore, a relay optical system for establishing an arrangement conjugate with a pupil position of the objective lens is needed, resulting in complication and an increase in size of the microscope optical system. Further, it is necessary to measure an aberration in advance in order to obtain an optimum compensated wave front, and a process for converging a correction amount in order to form an optimum wave front is required. Therefore, this technology is less feasible.

Further, an optical modulation element of an LCOS type has a polarization characteristic. On the other hand, laser light used for a light source also has a uniform polarization characteristic and therefore, matching the polarization characteristic of the optical modulation element and the polarization characteristic of the laser light makes it possible to correct an aberration for the entire light quantity. However, fluorescence generated in a specimen becomes substantially randomly polarized light due to motions of specimen molecules. Therefore, when using the optical modulation element of an LCOS type, the generated fluorescence which is randomly polarized light is corrected, the optical modulation element can correct only an aberration of a polarized component having a polarization characteristic coincident with that of the optical modulation element and therefore, other polarized components are not modulated. As a result, the polarized components having not been modulated are blocked by a confocal pinhole, resulting in a decrease in a light quantity received by a detector.

Further, a polarization characteristic of a light source of a laser microscope varies depending on the maker and in some cases light emitted from the light source may be circularly polarized light. In this manner, the light emitted from the light source is not always linearly polarized light. Further, even when the light emitted from the light source is linearly polarized light, a polarization axis thereof is not constant. Therefore, it is necessary to match a polarization characteristic of the wave front conversion element and a polarization characteristic of the light source, resulting in a problem in which the optical system becomes more complex.

In view of the above, an object of the invention is to solve the above problems and to provide an aberration correction optical unit capable of correcting a wave front aberration only by being inserted in an existing optical system. Further, another object of the invention is to provide an aberration correction optical unit capable of optimally correcting an aberration generated depending on a specimen or an observation condition in accordance with an observation mode or specifications of a microscope without the need of touching an objective lens by hand. Further, still another object of the present invention is to provide a laser microscope incorporated with an aberration correction device capable of acquiring an image having a high imaging performance.

Solution to Problem

In order to solve the above problems and accomplish the objects, the aberration correction optical unit of the invention includes the following constitution.

According to one aspect of the invention, an aberration correction optical unit which corrects a wave front aberration generated by an optical system is provided. This aberration correction optical unit includes: a first phase modulation element which includes an optical axis and corrects a predetermined component of a wave front aberration of the optical system for a polarized component parallel to the optical axis among a light flux passing through the optical system; a second phase modulation element which includes an optical axis and corrects the predetermined component of the wave front aberration for a polarized component parallel to the optical axis among the light flux passing through the optical system; and a variable waveplate which is disposed between the first phase modulation element and the second phase modulation element, includes an optical axis and changes a polarization characteristic of the light flux passing through the optical system. The variable waveplate is disposed so that the optical axis of the variable waveplate has a predetermined angle with respect the optical axis of the first phase modulation element or the optical axis of the second phase modulation element.

In the aberration correction optical unit, preferably, the first phase modulation element and the second phase modulation element are disposed so that the optical axis of the first phase modulation element and the optical axis of the second phase modulation element are parallel or orthogonal to each other and the optical axis of the variable waveplate has an angle of 45° with respect to the optical axis of the first phase modulation element or the optical axis of the second phase modulation element.

Further, in the aberration correction optical unit, preferably, the variable waveplate changes a phase modulation amount provided for a light flux according to a voltage to be applied.

Further, in the aberration correction optical unit, preferably, the first phase modulation element and the second phase modulation element are disposed so that the optical axis of the first phase modulation element and the optical axis of the second phase modulation element are parallel to each other and the variable waveplate is switched to function as a half-wave plate or as a waveplate providing a phase difference equivalent to an integral multiple of a wavelength of a light flux for two linearly polarized lights orthogonal to each other according to a change in a voltage to be applied.

Alternatively, in the aberration correction optical unit, preferably, the first phase modulation element and the second phase modulation element are disposed so that the optical axis of the first phase modulation element and the optical axis of the second phase modulation element are orthogonal to each other and the variable waveplate is switched to function as a half-wave plate or as a waveplate providing a phase difference equivalent to an integral multiple of a wavelength of a light flux for two linearly polarized lights orthogonal to each other according to a change in a voltage to be applied.

Further, preferably, the optical system includes an objective lens and the aberration correction optical unit is disposed between a coherent light source and the objective lens.

Further, in the aberration correction optical unit, preferably, each of the first phase modulation element, the second phase modulation element, and the variable waveplate is a liquid crystal element.

According to another aspect of the invention, a laser microscope is provided. The laser microscope includes: a first optical system which scans a specimen with a light flux from a coherent light source; an objective lens which focuses the light flux on the specimen; a detector; a second optical system which transmits, to the detector, a second light flux including specimen information output from the specimen by incidence of the light flux on the specimen; and any one of the aberration correction optical units disposed between the coherent light source and the objective lens.

This laser microscope preferably further includes a control circuit which controls a phase modulation amount provided for the light flux by the variable waveplate, by adjusting a voltage applied to the variable waveplate in accordance with an observation mode.

Effects of Invention

According to the invention, in observing a deep portion of a biospecimen or observing a specimen through a cover glass, an aberration correction optical unit and a laser microscope incorporated with the aberration correction optical unit can correct an aberration generated by deviation of the thickness of a cover glass from an estimated value and observing the specimen with enhanced resolution. In particular, the aberration correction optical unit and the laser microscope can correct an aberration appropriately by optimally controlling a polarization characteristic of the aberration correction optical unit in accordance with polarization characteristics of laser light illuminating a specimen and fluorescence generated from the specimen. Further, the aberration correction optical unit and the laser microscope are operable to electrically correct an aberration without the need of touching the objective lens by hand. This is advantageous in automatically optimizing the position of the objective lens and in adjusting the position of the objective lens in synchronization with an observation depth in the Z stacking process, without the cumbersomeness such as adjusting a correction ring.

Further, the aberration correction optical unit and the laser microscope are capable of correcting an aberration having a magnitude up to twice that of an existing aberration by controlling the aberration correction optical unit in accordance with an observation mode of a microscope such as a confocal laser microscope or a multi-photon microscope.

BRIEF DESCRIPTION OF DRAWINGS

FIG. 4B is a perspective diagram and a sectional diagram illustrating a phase distribution of a first-order coma aberration;

DESCRIPTION OF EMBODIMENTS

In the following, an aberration correction optical unit and a laser microscope incorporated with the aberration correction optical unit according to preferred embodiments of the invention are described in detail referring to the accompanying drawings.

Figure 1:
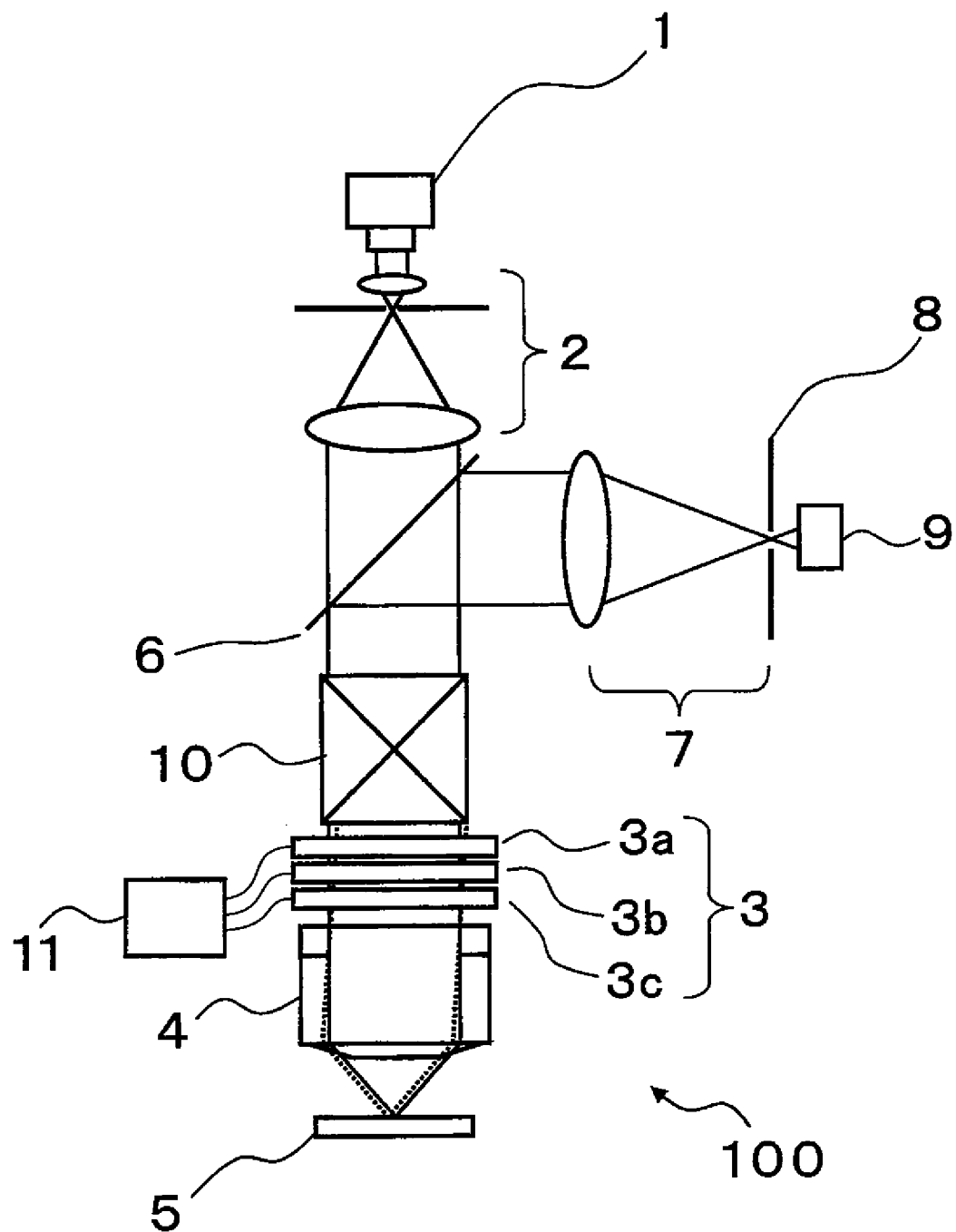
FIG. 1 is a schematic configuration diagram of a laser microscope according to an embodiment of the invention.

FIG. 1 is a schematic configuration diagram of a laser microscope 100 according to one embodiment of the invention. A light flux emitted from a laser light source 1 as a coherent light source is adjusted by a collimating optical system 2 into a parallel light. The parallel light is transmitted through an aberration correction optical unit 3 and thereafter, focused on a specimen 5 through an objective lens 4. A light flux including specimen information such as a light flux reflected or scattered on the specimen 5 or fluorescence generated on the specimen returns through an optical path, reflected by a beam splitter 6, and focused again on a confocal pinhole 8 by a confocal optical system 7 as a second optical system. The confocal pinhole 8 cuts a light flux from a position other than the focus position of the specimen and therefore, it is possible to obtain a signal having a good S/N ratio at a detector 9.

Further, although detailed description is omitted, the laser microscope 100 obtains a two-dimensional image of the specimen 5 by scanning the specimen 5 with laser light from the light source 1 by a scan optical system 10 along a plane orthogonal to the optical axis. Further, the laser microscope 100 changes a distance between the objective lens 4 and the specimen 5, scans the specimen 5 also along the optical axis direction, and obtains a two-dimensional image of the specimen 5 at each distance to obtain a three-dimensional image of the specimen.

The objective lens 4 is designed taking into consideration parameters including not only the inside of a lens system, but also a refractive index of a medium of the optical path from a lens tip to an observation plane and a distance therebetween, for example, a thickness of a cover glass or the presence or absence of a cover glass so as to optimize imaging performance with these estimated values. Therefore, an aberration is generated due to a depth of a biospecimen as an object to be observed or a thickness deviation resulting from a manufacturing error of a cover glass. Accordingly, in the present embodiment, a wave front aberration generated due to a deviation of an optical path length from a design value is estimated and a phase distribution which cancels the wave front aberration is displayed in the aberration correction optical unit 3 as a phase modulation profile, whereby the laser microscope 100 enhances imaging performance.

Generally, in view of the space, it is difficult to dispose an aberration correction optical unit at an incident pupil position of an objective lens and therefore, the aberration correction optical unit is disposed at a position conjugate with the incident pupil using a relay optical system. On the other hand, generally, an objective lens in a microscope is designed to be an infinite system, and a light flux incident on the objective lens is a parallel light. In the present embodiment, to avoid an increase in size of an optical system, it is preferable to omit the relay optical system and also to dispose the aberration correction optical unit 3 on the light source side of the objective lens 4, at a position in the vicinity of the objective lens 4. Disposing the aberration correction optical unit 3 as described above is advantageous for the laser microscope 100 to effectively obtain aberration correction effects. Further, a light flux emitted from the laser light source 1 passes through the aberration correction optical unit 3 twice, i.e., along an outward path and a return path and therefore, the aberration correction optical unit 3 corrects a phase of the light flux along both the outward path and the return path.

Figure 2A:
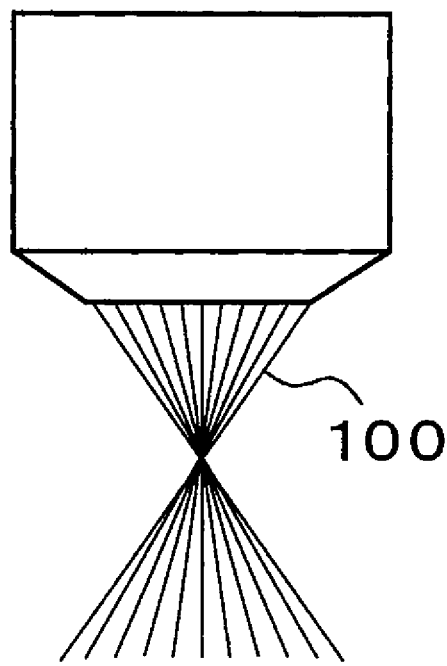
FIG. 2A is a diagram for representing an aberration generated in observing the surface of a specimen.
Figure 2B:
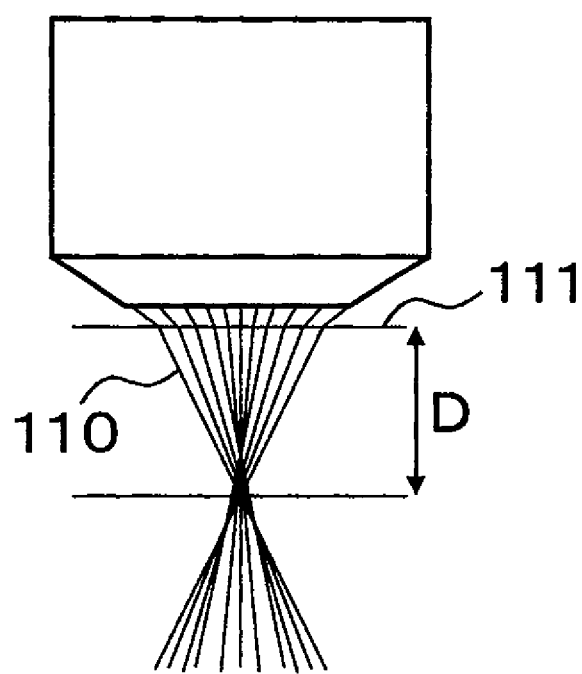
FIG. 2B is a diagram for representing an aberration generated in observing the inside of the specimen at a depth D.
Figure 3:
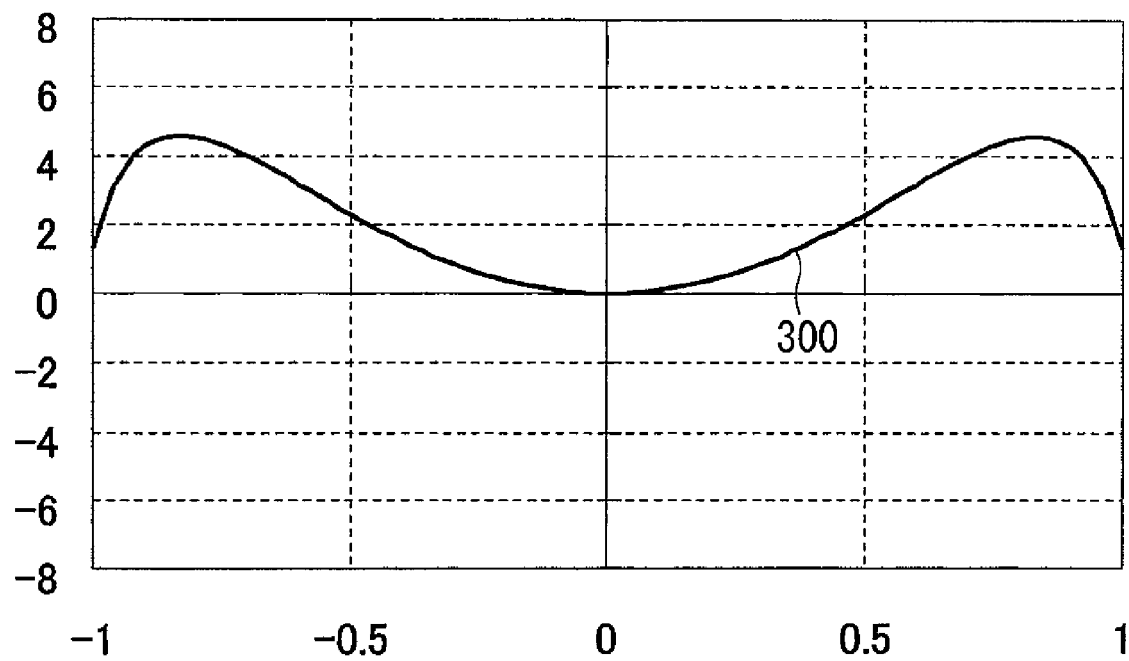
FIG. 3 is a diagram illustrating a phase distribution obtained by optical path calculation.

Next, an aberration generated by a depth of a specimen and a method for correcting the aberration are described in detail. An aberration generated by a depth of a specimen is as described above in FIG. 2B. Assuming that the inside of a specimen is observed through a water immersion lens, an example of calculating an optical path length is illustrated in FIG. 3. A curve 300 illustrated in FIG. 3 represents a phase distribution obtained by optical path calculation in using a water immersion lens having an NA of 1.15, assuming that a depth of the specimen and a refractive index are respectively designated as 250 μm and 1.39. FIG. 3 illustrates an aberration on the optical axis and the aberration is understood to form a spherical aberration pattern. The vertical axis in FIG. 3 indicates a phase difference amount obtained by normalizing a phase difference amount using a positive maximum value thereof, and the horizontal axis indicates a distance from the optical axis obtained by normalizing a maximum value of an effective diameter of the aberration correction optical unit to "1".

As described above, an aberration is generated in observing not a specimen surface but the inside of a specimen, and then the aberration is enlarged in proportion to mainly an NA of the objective lens and a specimen depth. The thus-generated aberration is represented as a phase distribution at an incident pupil position of the objective lens, and a phase modulation profile which cancels the aberration is displayed in the aberration correction optical unit 3 disposed at the incident pupil position of the objective lens 4, whereby the laser microscope 100 can focus a light flux on one spot in an observation position set inside the specimen 5, i.e., correct the aberration. In the same manner, a light flux generated on the specimen also returns along the optical path and therefore, the laser microscope 100 can convert the light flux into a plane wave.

Therefore, the aberration correction optical unit 3 includes two phase modulation elements 3a and 3c and a variable waveplate 3b disposed between the two phase modulation elements. A voltage from a control circuit 11 is applied to each of the phase modulation elements 3a and 3c and the variable waveplate 3b. The control circuit 11 controls the voltage applied to each of the phase modulation elements 3a and 3c and the variable waveplate 3b to control a phase modulation amount provided for a light flux. The control circuit 11 includes, for example, a processor and a drive circuit capable of changing a voltage output in response to a drive signal from the processor. A drive voltage applied to the phase modulation elements 3a and 3c and the variable waveplate 3b from the control circuit 11 is an AC voltage in order to perform, for example, pulse height modulation (PHM) or pulse width modulation (PWM).

One method for determining a phase modulation profile for wave front aberration correction is described below.

It is common to resolve a phase distribution of a wave front aberration into orthogonal functions such as Zernike polynomials, and represent the wave front aberration as a sum of terms. Resolving the phase distribution of the wave front aberration into orthogonal functions makes each term independently controllable. Items of a generated aberration differ depending on a cause for aberration generation and therefore, it is convenient that each term is independently controllable. For example, an aberration generated due to a specimen depth is a spherical aberration and therefore, when the specimen depth is changed, a term corresponding to the spherical aberration needs only to be controlled.

A wave front aberration is roughly classified into a symmetrical aberration as represented by a spherical aberration and an asymmetrical aberration as represented by a coma aberration. For example, when a wave front aberration is resolved into standard Zernike polynomials, the 13th coefficient ($Z_{13}$) represents a first-order spherical aberration and the 25th coefficient ($Z_{25}$) represents a second-order spherical aberration. In other words, these coefficients represent symmetrical aberrations.

Further, in the same manner, when the wave front aberration is resolved into standard Zernike polynomials, the 8th and 9th coefficients ($Z_8$, $Z_9$) each represent a first-order coma aberration, and the 18th and 19th coefficients ($Z_{18}$, $Z_{19}$) each represent a second-order coma aberration. In other words, these coefficients represent asymmetrical aberrations.

Figure 4A:
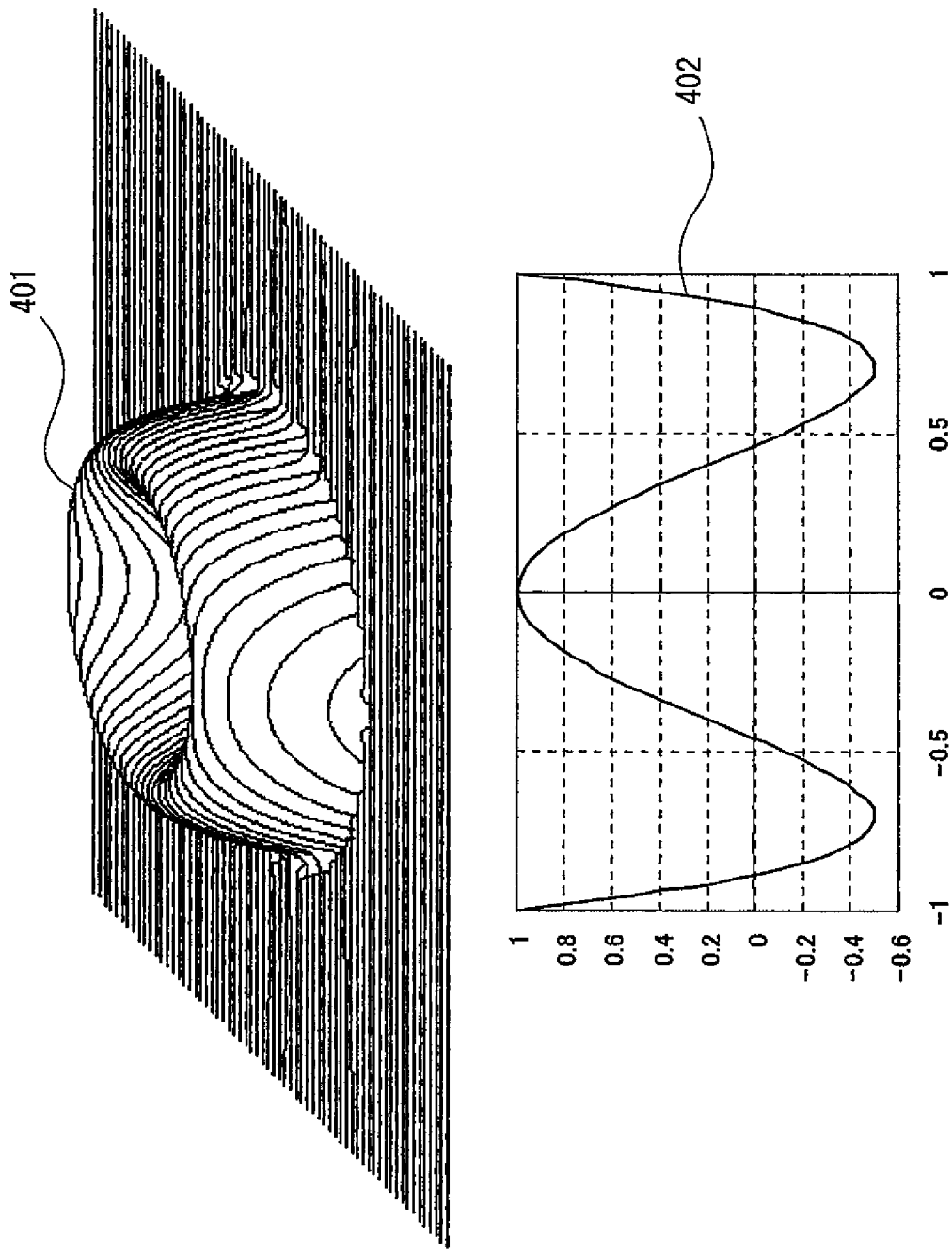
FIG. 4A is a perspective diagram and a sectional diagram illustrating a phase distribution of a first-order spherical aberration.
Figure 5A:
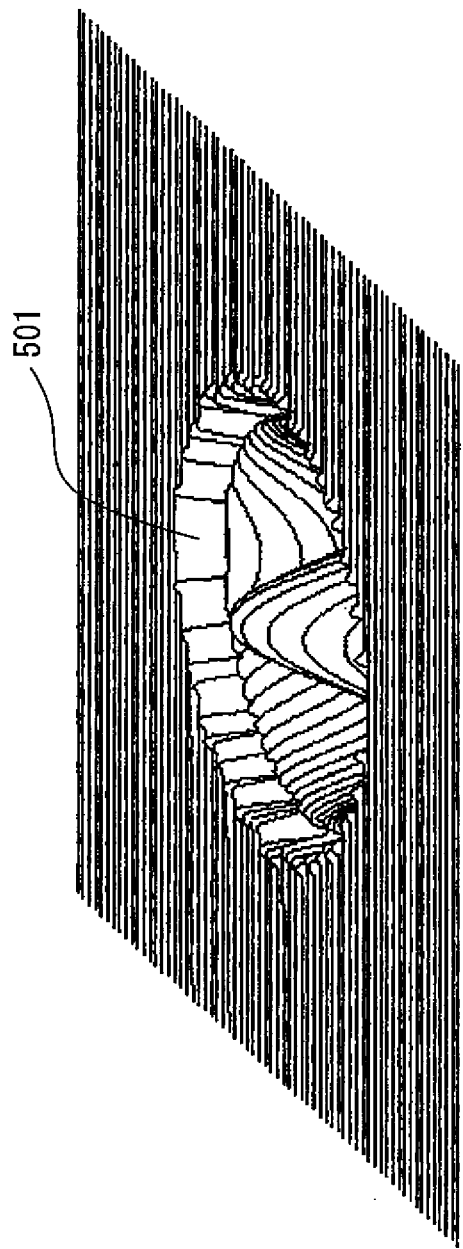
FIG. 5A is a perspective diagram and a sectional diagram illustrating a phase distribution of a second-order spherical aberration.
Figure 5A:
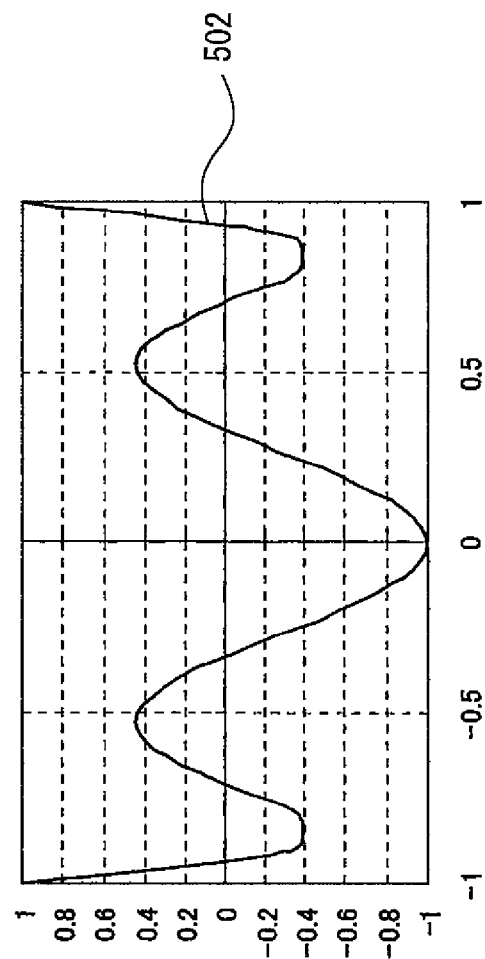
Figure 5B:
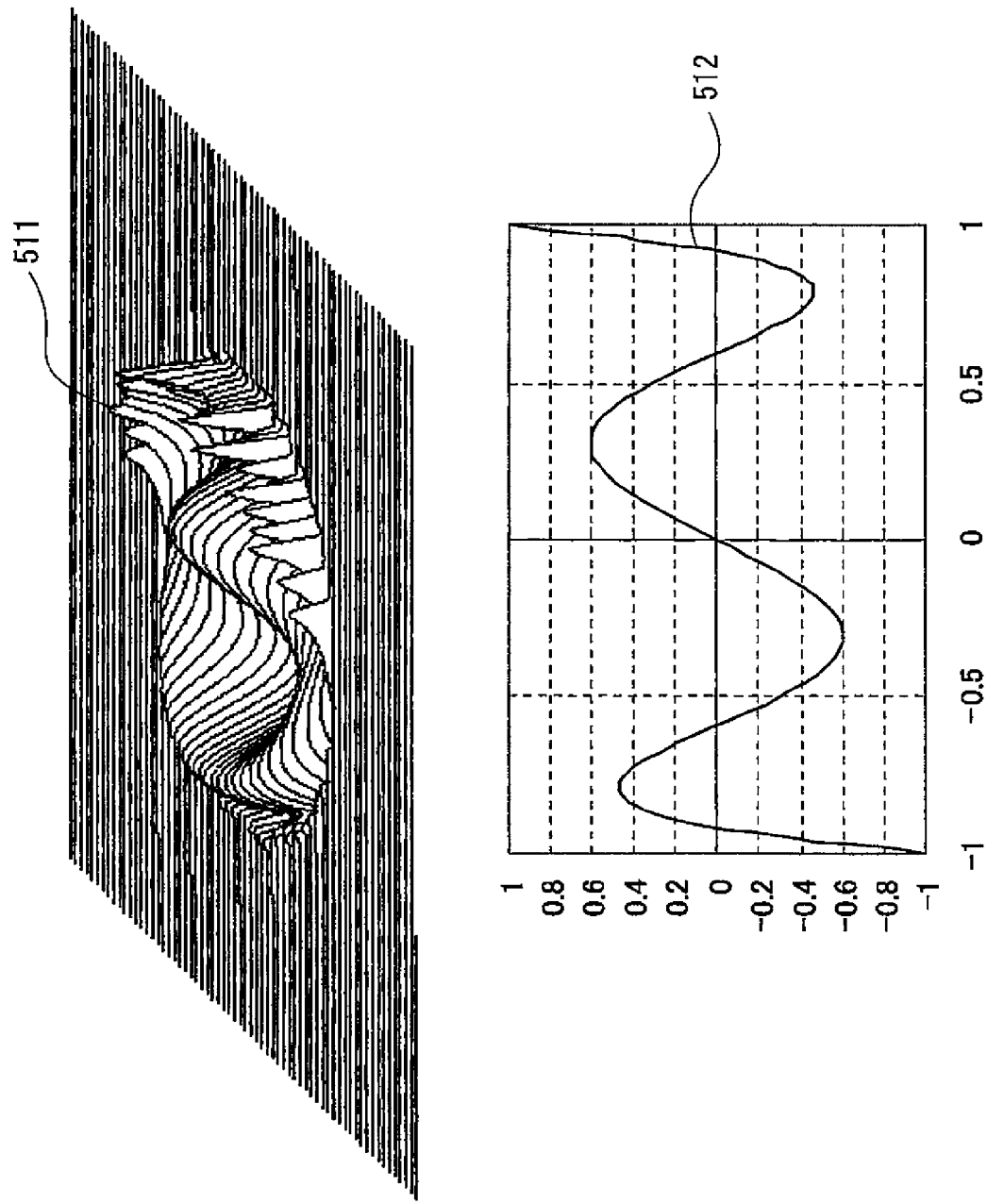
FIG. 5B is a perspective diagram and a sectional diagram illustrating a phase distribution of a second-order coma aberration.

The respective wave front shapes are illustrated in figures. FIG. 4A and FIG. 4B respectively illustrate a first-order spherical aberration and a first-order coma aberration. FIGS. 5A and 5B respectively illustrate a second-order spherical aberration and a second-order coma aberration.

A stereoscopic view 401 on the top side of FIG. 4A and a stereoscopic view 501 on the top side of FIG. 5A stereoscopically represent a wave front shape in the first-order spherical aberration and the second-order spherical aberration, respectively, and a curve 402 in a graph on the bottom side of FIG. 4A and a curve 502 in a graph on the bottom side of FIG. 5A each represent a phase distribution of an aberration in a plane passing through an optical axis corresponding to the stereoscopic view. In the each graph, the vertical axis represents a phase difference amount normalized so that a positive maximum value of the phase difference amount is "1" and the horizontal axis represents a distance from the optical axis normalized so that a maximum effective radius of the aberration correction optical unit is "1". In other words, the position "0" on the horizontal axis corresponds to a position on the optical axis.

A stereoscopic view 411 on the top side of FIG. 4B and a stereoscopic view 511 on the top side of FIG. 5B stereoscopically represent a wave front shape in the first-order coma aberration and the second-order coma aberration, respectively, and a curve 412 in a graph on the bottom side of FIG. 4B and a curve 512 in a graph on the bottom side of FIG. 5B each represent a phase distribution of an aberration in a plane passing through the optical axis corresponding to the stereoscopic view. In the same manner as in the graph on the bottom side of each of FIG. 4A and FIG. 5A, the vertical axis represents a phase difference amount normalized so that a positive maximum value of the phase difference amount is "1" and the horizontal axis represents a distance from the optical axis normalized so that a maximum effective radius of the aberration correction optical unit is "1".

An aberration generated in observing a specimen deep portion through an objective lens having a high NA is a complex aberration including a defocus, low-order and high-order spherical aberrations. Therefore, even when, for example, only an aberration corresponding to term $Z_{13}$ of standard Zernike polynomials is corrected, imaging performance is not sufficiently enhanced. Further, in taking into consideration off-axis characteristics and the like, an asymmetrical aberration needs to be also corrected, and in order to strictly correct an aberration, the aberration correction optical unit 3 is required to correct also terms corresponding to a high-order aberration and an asymmetrical aberration. Therefore, for sufficient aberration correction, a phase modulation profile corresponding to a term of each aberration needs to be displayed on a phase modulation element which is an example of an aberration correction element. Therefore, it is preferable to prepare a large number of phase modulation elements corresponding to respective terms and to use these phase modulation elements as an aberration correction optical unit by being stacked along the optical axis so that various types of phase modulation profiles can be displayed.

However, when phase modulation elements corresponding to all the terms of Zernike polynomials are prepared and these phase modulation elements are disposed along the optical axis, quite a few disadvantages such as a decrease in transmittance due to reflection on an interface between the elements are produced due to stacking of a plurality of phase modulation elements.

Therefore, the number of phase modulation elements included in the aberration correction optical unit 3 is preferably a minimum necessary number. Assuming that, for example, a defocus is variable by focusing of a microscope and a high-order aberration is negligibly small, the aberration correction optical unit 3 enhances imaging performance by correcting only term $Z_{13}$ corresponding to a first-order spherical aberration. For more accurate aberration correction, the aberration correction optical unit 3 corrects a high-order aberration or an asymmetrical aberration such as a tilt, a coma, and the like, as necessary. Further, when a generation ratio of an aberration corresponding to each term is constant, the aberration correction optical unit 3 can set a combined profile pattern which is a linear sum of the respective terms as a phase modulation profile. It is conceivable that, for example, a symmetrical aberration and an asymmetrical aberration are lumped together to correct a wave front aberration using two sets of phase modulation elements. In other words, for example, regarding a symmetrical aberration, the aberration correction optical unit 3 may represent a linear sum of a defocus, a first-order spherical aberration, and a third-order spherical aberration as a combined profile pattern.

Asymmetrical aberration such as a tilt or a coma aberration has directionality different from a symmetrical aberration. Therefore, for example, for the coma aberration, phase profiles are prepared from term $Z_8$ and term $Z_9$ which are patterns where Zernike coefficients are orthogonal to each other. When phase modulation elements displaying these phase profiles are laminated, a phase modulation profile having arbitrary directionality is displayed.

As described above, in observing a specimen deep portion through a high NA lens or the like, when resolution is insufficiently enhanced via only first-order aberration correction, it is conceivable that a first-order aberration term is added with a high-order aberration term to prepare a phase modulation profile. For example, when a phase modulation profile obtained by adding $Z_{25}$ in addition to $Z_{13}$ in Zernike polynomials, the aberration correction optical unit 3 can correct an aberration with higher accuracy. In other words, the aberration correction optical unit 3 forms a phase modulation profile as a pattern of a linear sum of term $Z_{13}$ and term $Z_{25}$. A ratio of each order is determined by an NA of a lens and a type such as a dry, a water immersion, and a liquid immersion type and therefore, a phase modulation profile may be designed in accordance with the objective lens 4.

Next, a case where a liquid crystal element is employed as a phase modulation element included in the aberration correction optical unit is described in detail with reference to FIG. 6 to FIG. 9.

Figure 6:
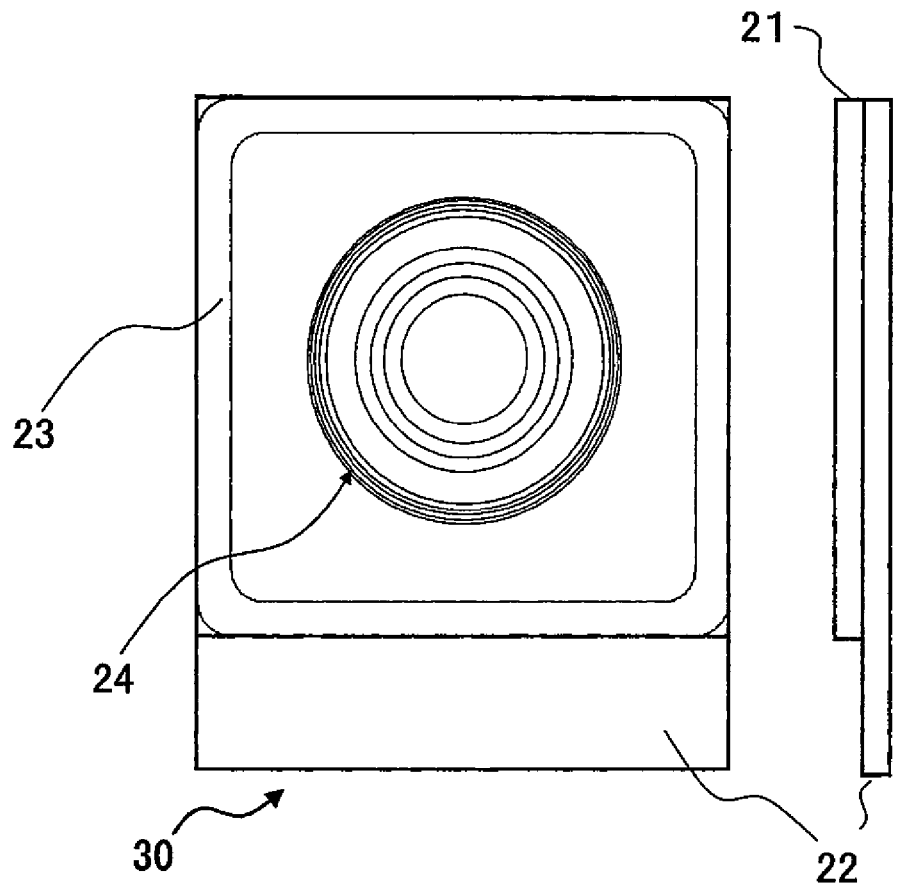
FIG. 6 is a plan view and a side view of a phase modulation element which is one example of an aberration correction optical unit.

FIG. 6 illustrates a plan view and a side view of a liquid crystal element 30 usable as the phase modulation element 3a or the phase modulation element 3c included in the aberration correction optical unit 3. A liquid crystal layer is sandwiched between transparent substrates 21 and 22 and a periphery thereof is sealed with a sealing member 23 to prevent liquid crystal leakage. A size of an active region 24 driving the liquid crystal is determined according to a pupil diameter of an objective lens. FIG. 6 illustrates an electrode pattern in which the liquid crystal element 30 functions as a phase modulation element correcting a symmetrical aberration. In this example, in order to correct the symmetrical aberration, in the active region 24, a plurality of transparent annular electrodes 25 are concentrically formed centered on the optical axis. On any one of the transparent substrates 21 and 22, a transparent electrode may be formed to entirely cover the active region 24. When the control circuit 11 controls voltages applied to the liquid crystal layer by the transparent, ring-shaped annular electrodes, the liquid crystal element 30 displays a phase modulation profile which cancels a symmetrical wave front aberration on the active region 24.

Figure 7:
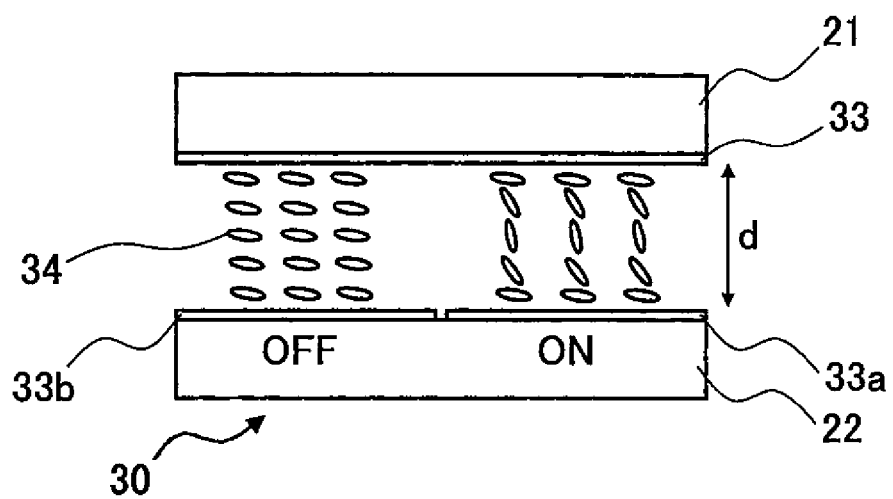
FIG. 7 is a sectional schematic diagram of a part of a homogeneously aligned liquid crystal element configuring an aberration correction optical unit.

FIG. 7 is a sectional schematic view of a part of the active region 24 of the liquid crystal element 30 of FIG. 6. In the liquid crystal element 30, liquid crystal molecules 34 are sandwiched between the transparent substrates 21 and 22. Transparent electrodes 33, 33a, and 33b are formed on surfaces on the sides opposite to each other of the transparent substrates 21 and 22. FIG. 7 illustrates a state in which a voltage is applied between the electrode 33a on the right half side and the electrode 33, while no voltage is applied between the electrode 33b on the left half side and the electrode 33. The liquid crystal molecules 34 have an elongated molecular structure and are homogeneously aligned. In other words, major axis directions of the liquid crystal molecules 34 sandwiched between the two substrates 21 and 22 are parallel to each other, and are aligned in parallel to an interface between each of the substrates 21 and 22 and the liquid crystal layer. In the liquid crystal molecules 34, a refractive index thereof in the major axis direction and a refractive index thereof in a direction orthogonal to the major axis direction differ from each other, and a refractive index $n_e$ with respect to a polarized component (extraordinary ray) in parallel to the major axis direction of the liquid crystal molecules 34 is commonly higher than a refractive index $n_o$ with respect to a polarized component (ordinary ray) in parallel to the minor axis direction of the liquid crystal molecules. Therefore, the liquid crystal element 30 in which the liquid crystal molecules 34 are homogeneously aligned acts as a uniaxial birefringent element.

Liquid crystal molecules have dielectric anisotropy and generally, a force works in a direction where the major axis of the liquid crystal molecules follows an electric field direction. In other words, as illustrated in FIG. 7, when a voltage is applied between the electrodes provided for the two substrates sandwiching the liquid crystal molecules, the major axis direction of the liquid crystal molecules is inclined from a state in parallel to the substrates toward a direction orthogonal to the surfaces of the substrates in accordance with the voltage. At that time, when a light flux of a polarized component in parallel to the major axis of the liquid crystal molecules is considered, a refractive index $n_\phi$ of the liquid crystal molecules is represented as $n_o \leq n_\phi \leq n_e$. Therefore, when a thickness of the liquid crystal layer is designated as d, an optical path length difference $\Delta nd$ $(=n_\phi d - n_o d)$ is generated between a light flux passing through a region applied with the voltage and a light flux passing through a region applied with no voltage in the liquid crystal layer. A phase difference is represented as $2\pi \Delta nd/\lambda$, where $\lambda$ is a wavelength of a light flux incident the liquid crystal layer.

The laser microscope 100 may include a plurality of laser light sources emitting laser lights having wavelengths different from each other. In this case, a required phase modulation amount differs depending on the laser light wavelength. Therefore, the control circuit 11 can correct a deviation in the phase modulation amounts due to a wavelength difference by changing a voltage to be applied to the liquid crystal layer of the liquid crystal element 30. Further, the control circuit 11 can cancel a deviation in the phase modulation amounts due to a temperature change or the like by adjusting the voltage to be applied to the liquid crystal layer of the liquid crystal element 30.

Next, a method for providing a desired phase distribution for a light flux passing through a phase modulation element of an aberration correction optical unit configured as a liquid crystal element is described in detail. First of all, a phase modulation profile to be displayed on the liquid crystal element 30 is determined and a pattern of each annular electrode is determined by dividing the profile at equal phase intervals.

Figure 8:
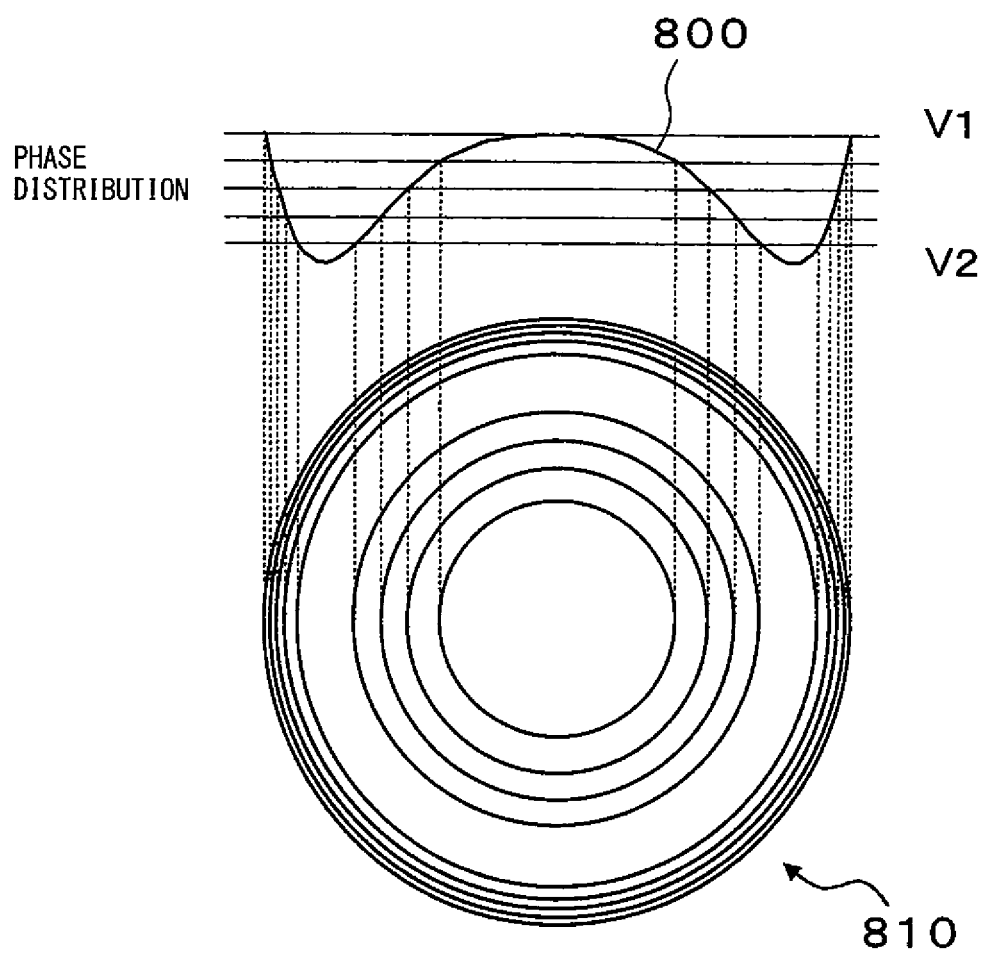
FIG. 8 is a diagram representing a method for determining an electrode structure of a phase modulation element according to one embodiment of the invention.

FIG. 8 is a diagram illustrating one example of an electrode pattern to be determined, for example, in accordance with a phase distribution of a phase modulation profile which cancels a symmetrical aberration in the liquid crystal element 30. A curve 800 illustrated on the top side represents a sectional view of a phase modulation profile corresponding to a plane passing through the optical axis, and on the bottom side, annular electrodes 810 determined in conformity to the phase modulation profile are illustrated. The bold lines in the figure illustrate spaces between the annular electrodes, and lead-out electrodes and others are not illustrated for simplification. When the control circuit 11 applies a voltage to each of the annular electrodes so that each voltage difference between the annular electrodes adjacent to each other achieves the same step in a voltage range where a relationship between a phase modulation amount provided for a light flux transmitted through the liquid crystal element 30 and an applied voltage is substantially linear, the liquid crystal element 30 can display a phase modulation profile in which a desired phase distribution is quantized.

In order to apply a voltage to each of the annular electrodes so that each voltage difference between the annular electrodes adjacent to each other achieves the same step, annular electrodes corresponding to a position where a phase modulation amount is maximized and to a position where the phase modulation amount is minimized are determined from a phase modulation profile. The control circuit 11 applies a voltage giving a maximum phase modulation amount and a voltage giving a minimum phase modulation amount to the respectively corresponding annular electrodes. Further, each of a plurality of annular electrodes is connected with adjacent annular electrodes and an electrode (a resistor) having the same electrical resistance and therefore, each voltage difference between the annular electrodes adjacent to each other achieves the same step by resistance division. Controlling the applied voltage in such a manner produces an advantage in which the control circuit 11 can be configured more simply than a drive circuit used in independently controlling a voltage applied to each of the annular electrodes.

Figure 9:
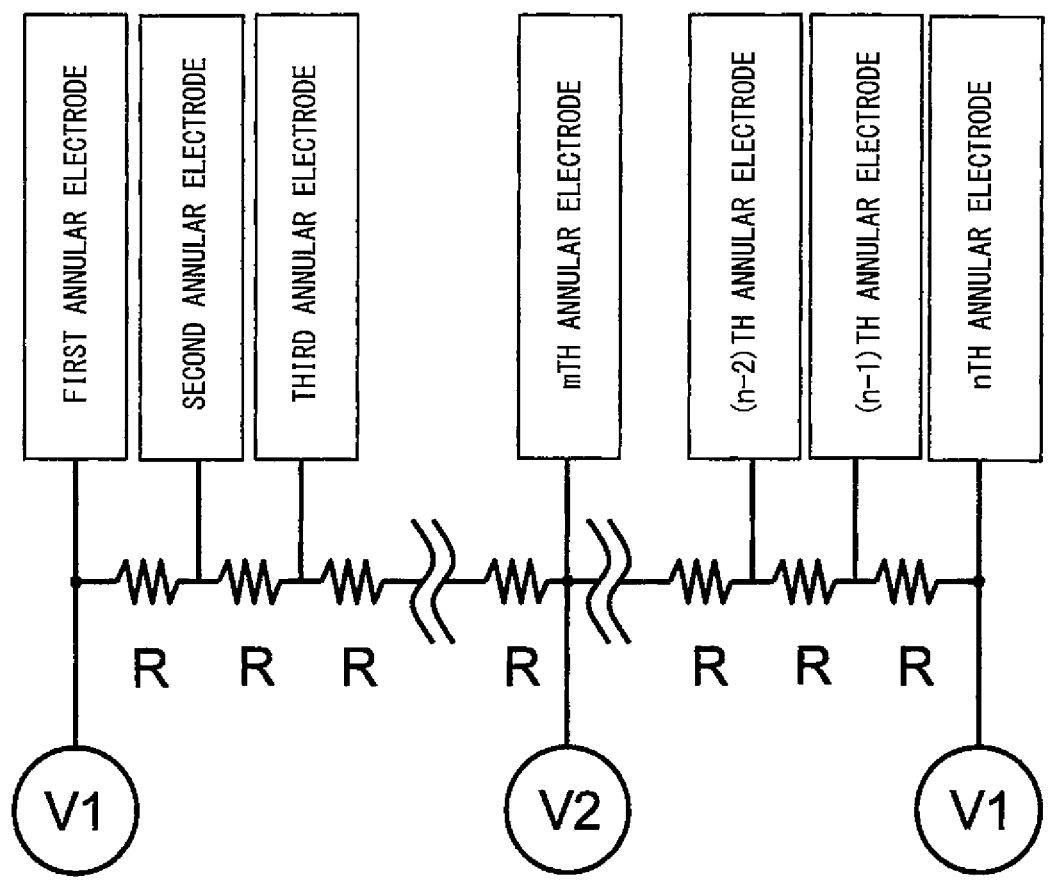
FIG. 9 is a schematic view representing a method for connecting between electrodes and a method for applying voltages to the electrodes in a phase modulation element according to one embodiment of the invention.

FIG. 9 is a diagram illustrating a relationship between each of the annular electrodes and a voltage to be applied in which the liquid crystal element 30 includes n annular electrodes. In FIG. 9, a center electrode is designated as an annular electrode 1, an outermost annular electrode is designated as an annular electrode n, and an annular electrode applied with a maximum voltage is designated as an annular electrode m.

FIG. 9 illustrates annular electrodes applied with voltages by the control circuit 11 upon 2-level drive. The same voltage V1 is applied to the annular electrode 1 which is the center electrode and the annular electrode n which is the outermost annular electrode, and a voltage V2 is applied to an mth (m=2, . . . , n−1) annular electrode m from the center. When a defocus value is selected so that phase modulation amounts of the center and the end portion in a phase distribution of a generated wave front aberration are equal, a phase modulation amount in the center electrode and a phase modulation amount in the outermost electrode coincide with each other. As a result, as seen in the example illustrated in FIG. 9, the voltage applied to the center electrode and the voltage applied to the outermost annular electrode n become the same. Further, when the control circuit 11 applies voltages to the liquid crystal element 30 in this manner, a PV value can be minimized. In this manner, in the example of 2-level drive, a difference between applied voltages V1 and V2 varies an amplitude of a phase modulation amount without changing a relative ratio in a phase modulation profile. Further, in this drive method, levels of voltage values directly applied to the annular electrodes by the control circuit 11 are 2 which is a small value, but there is a feature causing the phase modulation profile to be fixed as a single shape.

Further, also when a phase modulation profile with respect to an asymmetrical aberration is displayed on the liquid crystal element 30, an electrode pattern is formed each for a plurality of phase planes different from each other so that identical phase planes of the phase modulation profile to be displayed correspond to one electrode, in the same manner as in an electrode structure determined for a phase modulation profile with respect to a symmetrical aberration. When, for example, the liquid crystal element 30 is driven at 2 levels, the control circuit 11 applies a voltage to each of an electrode corresponding to a region of a liquid crystal layer giving a maximum phase modulation amount and an electrode corresponding to a region of the liquid crystal layer giving a minimum phase modulation amount correspondingly to each phase modulation amount. Voltages applied to a plurality of electrodes corresponding to regions where phase modulation amounts lie between the maximum phase modulation amount and the minimum phase modulation amount are determined via resistance division by a resistor connecting adjacent electrodes, and a region corresponding to each electrode is provided with a phase modulation amount corresponding to a voltage applied thereto. Thereby, the liquid crystal element 30 can display a phase modulation profile for an asymmetrical aberration.

Further, an asymmetrical aberration has directionality and therefore, it is necessary to superimpose two phase distributions orthogonal to each other in order for the aberration correction optical unit to display a phase modulation profile having optional directionality. For example, regarding a tilt, assuming that a plane orthogonal to the optical axis is the XY plane, a phase modulation element displaying a phase distribution to correct a wave front aberration corresponding to a tilt in the X axis direction and a phase modulation element displaying a phase distribution to correct a wave front aberration corresponding to a tilt in the Y axis direction are arrayed in the optical axis direction, and a phase distribution for correcting a wave front aberration corresponding to a tilt having an optional angle using a linear sum of the two displayed phase distributions is presented. When, for example, the control circuit 11 drives the respective phase modulation elements so that an amplitude ratio of phase distributions displayed on the phase modulation elements is 1:1, the aberration correction optical unit can display a phase distribution for correcting a wave front aberration corresponding to a tilt inclined in a direction of 45° to each of the X axis and the Y axis. In the simplest case, such phase modulation elements are achieved by laminating two identical liquid crystal elements so that electrode patterns of the respective liquid crystal elements are orthogonal to each other on a plane vertical to the optical axis. When a phase modulation element thickness increases or reflection on each interface is not preferable due to lamination of two phase modulation elements, the phase modulation elements may be formed into one liquid crystal element, and the electrode patterns may be provided so that the two electrode patterns driving a liquid crystal layer of the liquid crystal element are orthogonal to each other.

As described above, when it is assumed that phase modulation elements included in the aberration correction optical unit are formed with one liquid crystal element, the phase modulation element can correct only an aberration of a polarized component in one direction of an incident light flux, due to a polarization characteristic of the liquid crystal element. Further, laser light illuminating a specimen has a polarization characteristic. Therefore, when the polarization characteristic of the laser light coincides with a polarization characteristic of the phase modulation element, the above problem is avoidable. However, fluorescence or scattered light generated from the specimen is substantially randomly polarized light and therefore, when one liquid crystal element is used for the phase modulation elements, an uncorrected polarized component remains.

On the other hand, as described above, the phase modulation amount is determined by $\Delta nd$, and $\Delta nd$ is determined depending on a liquid crystal material. Therefore, to increase the phase modulation amount, a thickness d of a liquid crystal layer needs to be increased. However, in some cases, it is difficult to sufficiently increase the thickness d of the liquid crystal layer due to a limitation caused by a response speed of liquid crystal or surface accuracy of a transparent substrate. Therefore, a phase amount of a correctable aberration is limited.

Accordingly, in the present invention, as illustrated in FIG. 1, the aberration correction optical unit 3 includes the phase modulation element 3a, the variable waveplate 3b, and the phase modulation element 3c in order from the light source side along the optical axis. When the aberration correction optical unit 3 is configured as such a three-layer structure and a first phase modulation element 3a and a second phase modulation element 3c each are caused to share a phase modulation function, the present invention solves the above problems. The first phase modulation element 3a and the second phase modulation element 3c each display a phase modulation profile which provides a phase distribution correcting a symmetrical aberration or an asymmetrical aberration for a light flux transmitted through these elements. Further, it is assumed that the phase modulation element 3a and the phase modulation element 3c are liquid crystal elements having the same function (i.e., capable of correcting the same aberration component). For example, both the phase modulation element 3a and the phase modulation element 3c function as a phase modulation element correcting a symmetrical aberration and alternatively, both the phase modulation element 3a and the phase modulation element 3c function as a phase modulation element correcting an asymmetrical aberration.

Figure 10A:
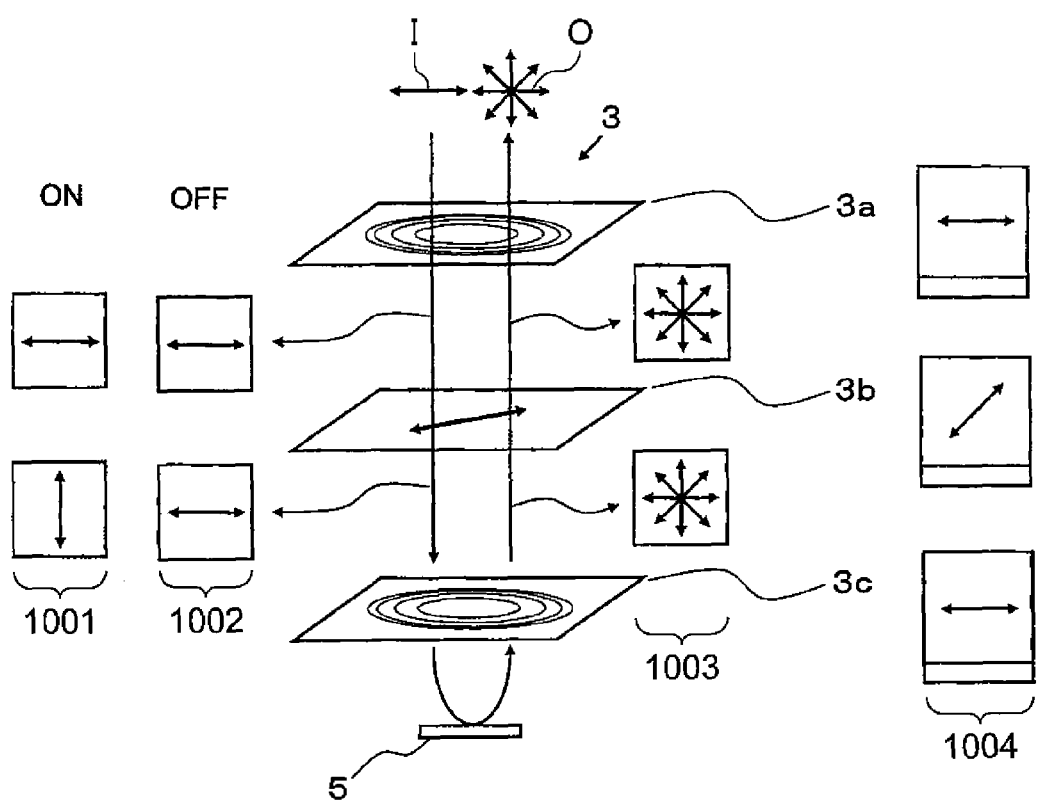
FIG. 10A is a diagram illustrating one example representing a relationship between optical axes of phase modulation elements configuring an aberration correction optical unit and an optical axis of a variable waveplate.

With reference to FIG. 10A, a structure of the aberration correction optical unit 3 and a function thereof will be described. In this example, the phase modulation elements 3a and 3c are the same liquid crystal element and are disposed so that optical axes (i.e., orientation directions of liquid crystal molecules) thereof coincide with each other. Between the phase modulation element 3a and the phase modulation element 3c, the variable waveplate 3b having an optical axis of an angle of 45° to the optical axis of each phase modulation element is inserted.

In the present embodiment, this variable waveplate 3b is also a liquid crystal element in which a liquid crystal layer is sandwiched between a pair of transparent substrates. For example, the variable waveplate 3b can be formed with the same liquid crystal element as the liquid crystal element employed in the phase modulation elements 3a and 3c. However, two transparent electrodes formed to sandwich the liquid crystal layer of the variable waveplate 3b are formed to cover the respective entire surfaces of both transparent substrates. Also in the variable waveplate 3b, in the same manner as the liquid crystal element that is the phase modulation elements described above, when a voltage is applied between the transparent electrodes disposed on the transparent substrates, as illustrated in FIG. 7, the major axis direction of liquid crystal molecules is inclined from a state in parallel to the transparent substrates toward a direction orthogonal to the surfaces of the transparent substrates in accordance with the applied voltage. Depending on a degree of inclination of the liquid crystal molecules to the surfaces of the transparent substrates, the variable waveplate 3b can modulate a phase of light passing through the liquid crystal layer.

When applying an optional voltage to two transparent electrodes sandwiching the liquid crustal layer of the variable waveplate 3b, the control circuit 11 can control a phase modulation amount provided for a light flux transmitted through the variable waveplate 3b. It is possible that, for example, the control circuit 11 controls an applied voltage so that the phase modulation amount is $\lambda/2$ to cause the variable waveplate 3b to function (ON) as a half-wave plate and alternatively, controls the applied voltage so that the phase modulation amount is an integral multiple of a wavelength 0, $\lambda$, or the like to cause the variable waveplate 3b not to function (OFF) as a half-wave plate. In this manner, the control circuit 11 can control variably the function of the variable waveplate 3b as a waveplate. In the following description, an example will be described in which by controlling an applied voltage, the variable waveplate 3b becomes switchable between a state (ON) where the optical axis of the variable waveplate 3b is inclined at 45° to the optical axes of the phase modulation elements 3a and 3c and a state (OFF) where the optical axis of the variable waveplate 3b is not inclined to the optical axes of the phase modulation elements 3a and 3c.

A column 1004 of the rightmost end of FIG. 10A represents an optical axis direction of each element upon viewing each of the phase modulation elements 3a and 3c and the variable waveplate 3b from the light source side. Each arrow indicates the optical axis. FIG. 10A illustrates a polarization direction of a light flux transmitted through each element in a state (ON) where the variable waveplate 3b functions as a half-wave plate and a state (OFF) of not functioning as a half-wave plate, by controlling an applied voltage.

A first column 1001, a second column 1002, and a third column 1003 in order from the left end of FIG. 10A each indicate polarization states of a light flux reciprocating by passing through the aberration correction optical unit 3 in anteroposterior positions of the variable waveplate 3b. In these columns, each arrow represents a polarization direction of illuminating light. For example, in the column 1001 of the left end, illuminating light before entering the phase modulation element 3a is linearly polarized light parallel to the paper plane, and when the variable waveplate 3b functions (ON) as a half-wave plate, a polarization state of light is illustrated in each position down to irradiation of the specimen 5.

As illustrated in FIG. 10A, assuming that illuminating light before entering the phase modulation element 3a is linearly polarized light I (in the figure, the polarization plane is horizontal) parallel to the paper plane, a polarization plane of the illuminating light is parallel to the optical axis direction of the first phase modulation element 3a and therefore, the aberration for the illuminating light is corrected when passing through the first phase modulation element 3a. Thereafter, when the variable waveplate 3b functions (ON) as a half-wave plate as seen in the column 1001, the illuminating light passes through the variable waveplate 3b and thereby, the polarization plane thereof is rotated by 90° (therefore, in the figure, the polarization plane is vertical). As a result, the polarization plane of the illuminating light is orthogonal to the optical axis direction of the second phase modulation element 3c and therefore, the phase of the illuminating light is not modulated even when being transmitted through the second phase modulation element 3c.

The illuminating light is focused on the specimen 5 and then light O such as fluorescence and the like from the specimen 5 is generated. As illustrated in the column 1003, the light O generated from the specimen 5 becomes randomly polarized light. The optical axis direction of the second phase modulation element 3c is the horizontal direction illustrated by the bottom arrow of the column 1004 and therefore, of the polarized components of the light generated from the specimen 5, an aberration for only a polarized component of the optical axis direction of the second phase modulation element 3c is corrected by the second phase modulation element 3c. Thereafter, when the light generated from the specimen 5 is transmitted through the variable waveplate 3b, the polarization direction is rotated by 90°. Therefore, of the polarized components of the light generated from the specimen 5, the phases of the remaining polarized components having not been corrected by the second phase modulation element 3c are modulated by the first modulation element 3a. As a result, the aberration for all the polarized components of the light generated from the specimen 5 are corrected. Further, the present invention has an advantage in which the 90° rotation of the polarization plane of a light flux passing through the variable waveplate 3b makes it possible to use elements having not only the same optical characteristics but also the same outer structure as the first phase modulation element 3a and the second phase modulation element 3c.

Further, for the illuminating light, a polarization axis of laser light varies depending on the manufacturer even when the laser light is linearly polarized light. In such a case, a polarization characteristic of a phase modulation element needs to coincide with a polarization characteristic of light sources of various types of microscopes and therefore, adjustments therefor are cumbersome. However, the aberration correction optical unit 3 of the present invention uses a variable waveplate and thereby, the polarization dependence of light entering the aberration correction optical unit 3 is eliminated. Therefore, without considering a rotation angle of a polarization plane in plane orthogonal to the optical axis of a light source with respect to the laser microscope 100, the aberration correction optical unit 3 is mountable in the laser microscope 100.

Further, the aberration correction optical unit 3 is commonly usable for all models even when observation modes thereof differ. For example, by changing a phase modulation amount when a confocal mode is used as an observation mode from a phase modulation amount when a multi-photon mode is used as the observation mode, the aberration correction optical unit 3 may be used in both observation modes.

Further, in many cases, laser light used as a light source is linearly polarized light or circularly polarized light each having a different polarization characteristic, depending on a difference in the observation mode of a microscope manufacturer, a model, or the like. However, the aberration correction optical unit 3 of the present invention includes a variable waveplate and therefore, by adjusting the variable waveplate, it becomes possible to observe a specimen in various types of observation modes, for example, in a mode of irradiating a specimen with linearly polarized light or a mode of irradiating the specimen with circularly polarized light, independently of a polarization characteristic of laser light. When, for example, laser light incident from the light source is linearly polarized light of a predetermined direction, the variable waveplate of the aberration correction optical unit 3 is caused to function as a half-wave plate and thereby, the aberration correction optical unit 3 can convert the incident laser light into linearly polarized light of a direction orthogonal to the predetermined direction. Alternatively, when the variable waveplate of the aberration correction optical unit 3 is caused to function as a quarter waveplate, the aberration correction optical unit 3 can convert the incident laser light into circularly polarized light.

Next, a state (OFF) where the variable waveplate 3b does not function as a half-wave plate by adjusting an applied voltage driving the variable waveplate 3b will be described. The control circuit 11 can cause the variable waveplate 3b to be switched off by causing a birefringent amount of the variable waveplate 3b to be an integral multiple of a wavelength $\lambda$ of incident light, i.e., by adjusting the birefringent amount to cause a phase difference provided between two linearly polarized lights orthogonal to each other by the variable waveplate 3b to be an integral multiple of $2\pi$, using a voltage applied to the variable waveplate 3b. The column 1002 in FIG. 10A illustrates a polarization state of a light flux passing through the aberration correction optical unit 3 upon causing the variable waveplate 3b to be switched off.

In the same manner as described above, when illuminating light having the linearly polarized light I (in the figure, the polarization plane is horizontal) parallel to the paper plane is transmitted through the first phase modulation element 3a, the aberration for the illuminating light is corrected. The variable waveplate 3b does not function (OFF) as a half-wave plate and therefore, as illustrated by the arrow on the bottom side of the column 1002, a polarization plane of the illuminating light passing through the variable waveplate 3b is not rotated and then the polarization plane remains horizontal. A polarized component whose phase is modulated by the first phase modulation element 3a is the same as a polarized component whose phase is modulated by the second phase modulation element 3c, and a polarization characteristic of the illuminating light and polarization characteristics of both phase modulation elements coincide with each other. As a result, a phase modulation amount for the illuminating light is doubled.

When the variable waveplate 3b does not function (OFF) as a half-wave plate in this manner, the polarization dependency of the aberration correction optical unit 3 is not eliminated but an aberrant correct amount of the aberration correction optical unit 3 is doubled. Therefore, the aberration correction optical unit 3 can correct an aberration of illuminating light focused on an observation position set in a deeper region of a specimen and therefore, the laser microscope 100 can observe the specimen of the observation position set in the deeper region with high resolution. When the laser microscope 100 is a fluorescence microscope differing in observation mode from a confocal microscope, the laser microscope 100 observes fluorescence generated by a specimen by illuminating the specimen. Therefore, of polarized components of the generated fluorescence, only an aberration of a polarized component coincident with the optical axis of a phase modulation element is corrected but a polarized component orthogonal to the optical axis of the phase modulation element is not corrected. However, the polarized component whose aberration is not corrected is cut by a confocal pinhole (may be cut, alternatively, by inserting a polarizer on the optical path) and therefore, the laser microscope 100 can acquire an image with high resolution while light quantity is decreased. Therefore, when the laser microscope 100 is a fluorescence microscope, the aberration correction optical unit 3 produces a larger aberration correction effect.

Further, when the laser microscope 100 is a multi-photon microscope, the aberration correction optical unit 3 needs to correct only an aberration of illuminating light and therefore, no influence in aberration on generated fluorescence is produced. Therefore, when the laser microscope 100 is a fluorescence microscope, the aberration correction optical unit 3 more effectively performs aberration correction. This results from a difference between an optical system of the multi-photon microscope and an optical system of the confocal microscope in which fluorescence is generated by multi-photon absorption only in a region having high laser density, and since even without a confocal pinhole, the same sectioning effect as in the confocal microscope is obtained, the multi-photon microscope acquires all of the generated fluorescence to form an image.

In the aberration correction optical unit 3 illustrated in FIG. 10A, two polarization axis (i.e., optical axis) directions of the phase modulation elements 3a and 3c coincide with each other. However, the two optical axes of the phase modulation elements 3a and 3c may be orthogonal to each other. In this case, when the phase modulation amount is changed by the variable waveplate 3b, the same effect is produced.

One advantage of the variable waveplate of the present embodiment is that, by changing the drive voltage, birefringence can be always controlled to be $\lambda/2$ independently of a wavelength of incident laser light. When the variable waveplate 3b is caused to function as a half-wave plate, it is possible that the variable waveplate 3b rotates a polarization plane of a light flux of a wavelength $\lambda$ by 90° and eliminates a polarized component in which an aberration thereof is difficult to be corrected by the aberration correction optical unit 3. However, when light fluxes of a plurality of wavelengths simultaneously enter the aberration correction optical unit 3 as illuminating light, a phase modulation amount of the variable waveplate 3b, as an example, is determined in conformity to an average wavelength of the incident light. In this case, the variable waveplate 3b functions as a waveplate corresponding to a wavelength shifted from $\lambda/2$ to some extent for laser light of a wavelength shifted from the average wavelength. Therefore, it is difficult to convert all the polarized components of the laser light of the wavelength into a polarized component orthogonal to a polarization direction before entering the variable waveplate 3b and as a result, light emitted from the variable waveplate 3b becomes ellipsoidally polarized light.

Figure 10B:
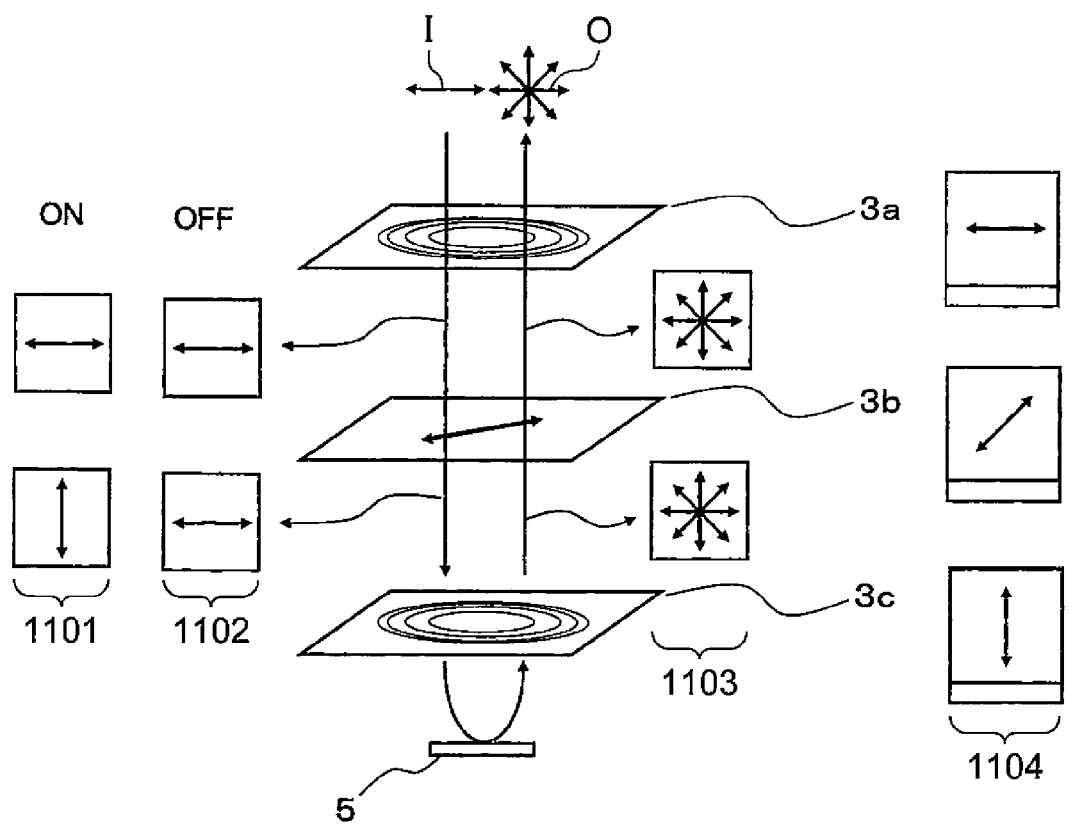
FIG. 10B is a diagram illustrating another example representing a relationship between optical axes of phase modulation elements configuring an aberration correction optical unit and an optical axis of a variable waveplate.

In such a case, the phase modulation elements 3a and 3c are disposed so that two optical axis directions of the phase modulation elements 3a and 3c are orthogonal to each other. FIG. 10B illustrates a relationship between optical axes of phase modulation elements and an optical axis of a variable waveplate, in which two optical axes of the phase modulation elements 3a and 3c are orthogonal to each other. The respective arrows of a column 1101, a column 1102, and a column 1103 in FIG. 10B indicate polarization directions in the respective positions with respect to the illuminating light flux I passing through the aberration correction optical unit 3 to be focused on the specimen 5 and the light flux O emitted from the specimen 5, in the same manner as the arrows of the columns 1001 to 1003 of FIG. 10A, and the respective arrows of the column 1104 indicate optical axis directions of the phase modulation elements 3a and 3c and the variable waveplate 3b.

As illustrated in the column 1102 of FIG. 10B, when the variable waveplate 3b is caused not to function (OFF) as a half-wave plate, a polarization characteristic of light transmitted through the variable waveplate 3b remains unchanged. Therefore, when the illuminating light I passes through the phase modulation elements 3a and 3c where the optical axes thereof are orthogonal to each other, the aberration correction optical unit 3 can modulate phases of all the polarized components of the illuminating light and therefore, aberrations of all the polarized components of the illuminating light are correctable. Further, in this case, the variable waveplate 3b performs no phase modulation for the illuminating light and therefore, it is unnecessary to consider a wavelength dispersion characteristic of the variable waveplate 3b.

On the other hand, when a phase modulation amount for light passing through the aberration correction optical unit 3 is intended to be doubled, the control circuit 11 adjusts a voltage applied to the variable waveplate 3b to cause birefringence of the variable waveplate 3b to be λ/2 (ON) (illustrated in the column 1101). In this case, a problem on a wavelength dispersion characteristic with respect to a phase modulation amount of the variable waveplate 3b occurs. However, there is a strong demand for an increase in a range of the phase modulation amount upon using the aberration correction optical unit 3 in a multi-photon microscope. On the other hand, in the multi-photon microscope, it is unusual that illuminating light of a plurality of wavelengths excites a specimen and therefore, even a configuration in which two optical axes of the phase modulation elements 3a and 3c are orthogonal to each other is sufficiently advantageous.

As has been described above, this aberration correction optical unit can perform phase modulation for all the polarized components of light entering the aberration correction optical unit. Therefore, the aberration correction optical unit can correct an aberration generated in an optical system including the aberration correction optical unit, independently of polarized components of light passing through the optical system.

In the embodiments described above, a liquid crystal element is used as the phase modulation elements and the variable waveplate of the aberration correction optical unit, but the phase modulation elements and the variable waveplate are not limited to the liquid crystal element. For example, an optical crystal element having an electro-optic effect represented by a Pockels effect may also be used as the phase modulation elements or the variable waveplate.

Further, the respective embodiments which have been described above illustrated examples in which the aberration correction optical unit of the present invention is used for a laser microscope, but the present invention is not limited to these embodiments. Further, the embodiments illustrate an aberration correction optical unit which corrects either a symmetrical aberration or an asymmetrical aberration, but the aberration correction optical unit may be configured to correct both a symmetrical aberration and an asymmetrical aberration. In this case, both an aberration correction optical unit used for a symmetrical aberration and an aberration correction optical unit used for an asymmetrical aberration are disposed on the optical path. In other words, two sets of a combination of the first phase modulation element 3a, the variable waveplate 3b, and the second phase modulation element 3c are disposed on the optical path. Alternatively, the variable waveplate 3b may be disposed between the first phase modulation element 3a including a phase modulation element correcting a symmetrical aberration and a phase modulation element correcting an asymmetrical aberration and the second phase modulation element 3c including a phase modulation element correcting a symmetrical aberration and a phase modulation element correcting an asymmetrical aberration.

Further, the aberration correction optical unit of the present invention may be employed for any device using a coherent light source and an objective lens and thereby, enhanced resolution is achievable.

DESCRIPTION OF THE REFERENCE NUMERALS 100. laser microscope
1. laser light source
2. collimating optical system
3. aberration correction optical unit
3a. first phase modulation element
3b. variable waveplate
3c. second phase modulation element
4. objective lens
5. specimen
6. beam splitter
7. confocal optical system
8. confocal pinhole
9. detector
10. scan optical system
30. liquid crystal element
21, 22. transparent substrates
23. sealing member
33. transparent electrode
34. liquid crystal molecules

What is claimed is:

1. An aberration correction optical unit which corrects a wave front aberration generated by an optical system, comprising:
   a first phase modulation element which includes an optical axis and corrects a predetermined component of a wave front aberration of the optical system for a polarized component parallel to the optical axis among a light flux passing through the optical system;
   a second phase modulation element which includes an optical axis and corrects the predetermined component of the wave front aberration for a polarized component parallel to the optical axis among the light flux passing through the optical system; and
   a variable waveplate which is disposed between the first phase modulation element and the second phase modulation element, includes an optical axis and changes a polarization characteristic of the light flux,
   wherein the variable waveplate is disposed so that the optical axis of the variable waveplate has a predetermined angle with respect to the optical axis of the first phase modulation element or the optical axis of the second phase modulation element.

2. The aberration correction optical unit according to claim 1, wherein the first phase modulation element and the second phase modulation element are disposed so that the optical axis of the first phase modulation element and the optical axis of the second phase modulation element are parallel or orthogonal to each other; and the predetermined angle is 45°.

3. The aberration correction optical unit according to claim 1, wherein the variable waveplate changes a phase modulation amount provided for the light flux according to a voltage to be applied.

4. The aberration correction optical unit according to claim 3, wherein the first phase modulation element and the second phase modulation element are disposed so that the optical axis of the first phase modulation element and the optical axis of the second phase modulation element are parallel to each other; and the variable waveplate is switched to function as a half-wave plate or to function as a waveplate providing a phase difference equivalent to an integral multiple of a wavelength of the light flux for two linearly polarized lights orthogonal to each other according to a change of the voltage to be applied.

5. The aberration correction optical unit according to claim 3, wherein the first phase modulation element and the second phase modulation element are disposed so that the optical axis of the first phase modulation element and the optical axis of the second phase modulation element are orthogonal to each other; and the variable waveplate is switched to function as a half-wave plate or to function as a waveplate providing a phase difference equivalent to an integral multiple of a wavelength of the light flux for two linearly polarized lights orthogonal to each other according to a change of the voltage to be applied.

6. The aberration correction optical unit according to claim 1, wherein the optical system includes an objective lens, the system being disposed between a coherent light source and the objective lens.

7. The aberration correction optical unit according to claim 1, wherein each of the first phase modulation element, the second phase modulation element, and the variable waveplate is a liquid crystal element.

8. A laser microscope comprising:
   a first optical system which scans a specimen with a light flux from a coherent light source;
   an objective lens which focuses the light flux on the specimen;
   a detector;
   a second optical system which transmits, to the detector, a second light flux including specimen information output from the specimen by incidence of the light flux on the specimen; and
   the aberration correction optical unit according to claim 1 disposed between the coherent light source and the objective lens.

9. The laser microscope according to claim 8 further comprising a control circuit which controls a phase modulation amount provided for the light flux by the variable waveplate by adjusting a voltage applied to the variable waveplate in accordance with an observation mode.

* * * * *